US 7,414,092 B2

(12) United States Patent
Steidl et al.

(10) Patent No.: US 7,414,092 B2
(45) Date of Patent: Aug. 19, 2008

(54) ELECTROSTERICALLY STABILIZED AQUEOUS POLYURETHANE RESINS, METHOD FOR THE PRODUCTION THEREOF, AND USE THEREOF

(75) Inventors: Norbert Steidl, Kienberg (DE); Alois Maier, Engelsberg (DE); Franz Wolfertstetter, Palling (DE); Christian Huber, Trostberg (DE); Sascha Raspl, Garching (DE)

(73) Assignee: Construction Research & Technology GmbH, Trostberg (DE)

(*) Notice: Subject to any disclaimer, the term of this patent is extended or adjusted under 35 U.S.C. 154(b) by 2 days.

(21) Appl. No.: 10/551,526

(22) PCT Filed: Apr. 1, 2004

(86) PCT No.: PCT/EP2004/003480

§ 371 (c)(1),
(2), (4) Date: Sep. 30, 2005

(87) PCT Pub. No.: WO2004/087779

PCT Pub. Date: Oct. 14, 2004

(65) Prior Publication Data

US 2006/0205869 A1  Sep. 14, 2006

(30) Foreign Application Priority Data

Apr. 3, 2003  (DE) ................ 103 15 175

(51) Int. Cl.
*C08J 3/00* (2006.01)
*C08K 3/20* (2006.01)
*C08L 75/00* (2006.01)

(52) U.S. Cl. .............. 524/591; 524/589; 524/590; 524/839; 524/840

(58) Field of Classification Search .............. 524/589, 524/590, 591, 839, 840
See application file for complete search history.

(56) References Cited

U.S. PATENT DOCUMENTS

| | | | |
|---|---|---|---|
| 4,092,286 A | | 5/1978 | Noll et al. |
| 4,238,378 A | | 12/1980 | Markusch et al. |
| 4,303,774 A | | 12/1981 | Nachtkamp et al. |
| 4,501,852 A | * | 2/1985 | Markusch et al. ........... 524/591 |
| 4,764,553 A | | 8/1988 | Mosbach et al. |
| 4,871,798 A | | 10/1989 | Dormish et al. |
| 4,921,842 A | | 5/1990 | Henning et al. |
| 5,804,647 A | | 9/1998 | Nachtkamp et al. |
| 2003/0004264 A1 | | 1/2003 | Maier et al. |

FOREIGN PATENT DOCUMENTS

| | | |
|---|---|---|
| DE | 25 51 094 C2 | 5/1977 |
| DE | 2 651 505 C2 | 5/1978 |
| DE | 26 51 505 A | 5/1978 |
| DE | 27 30 514 A1 | 1/1979 |
| DE | 28 16 815 A1 | 10/1979 |
| DE | 36 41 494 A1 | 6/1988 |
| DE | 37 27 252 A1 | 2/1989 |
| DE | 37 35 587 A1 | 5/1989 |
| DE | 44 18 157 A1 | 11/1995 |
| DE | 198 12 751 C2 | 10/1999 |
| DE | 198 33 819 A1 | 2/2000 |
| DE | 199 59 170 A1 | 7/2001 |
| DE | 100 06 539 A1 | 8/2001 |
| DE | 101 22 444 A | 11/2002 |
| DE | 101 22 444 A1 | 11/2002 |
| EP | 0 000 347 | 1/1979 |
| EP | 0 404 371 B1 | 12/1990 |
| EP | 0 595 149 A | 5/1994 |
| EP | 0 684 286 | 11/1995 |
| EP | 0 792 900 B1 | 9/1997 |

OTHER PUBLICATIONS

Kim, et al., Aqueous Dispersion of Polyurethanes from $H_{12}MDI$, PTAd/PPG, and DMPA: Particle Size of Dispersion and Physical Properties of Emulsion Cast Films, Dept. of Polymer Science and Engineering, (1991).

* cited by examiner

*Primary Examiner*—Patrick D Niland
(74) *Attorney, Agent, or Firm*—Fulbright & Jaworski L.L.P.

(57) ABSTRACT

Stabilized polyurethane resins and methods for their preparation are disclosed.

7 Claims, No Drawings

ELECTROSTERICALLY STABILIZED AQUEOUS POLYURETHANE RESINS, METHOD FOR THE PRODUCTION THEREOF, AND USE THEREOF

This is a §371 of PCT/EP2004/003480 filed Apr. 1, 2004, which claims priority from German Patent Application No. 103 15 175.3 filed Apr. 3, 2003.

The present invention relates to electrosterically stabilized aqueous polyurethane dispersions, to a process for preparing them, and to their use for improving and modifying, inter alia, mineral binders.

The binder class of the aqueous or water-based polyurethanes has been known for more than 40 years. The profile of properties of water-based polyurethanes has been continually improved over past decades, as forcefully demonstrated by a multiplicity of patents and publications in this subject area. Regarding the chemistry and technology of water-based polyurethanes, reference may be made to D. Dieterich, K. Uhlig in *Ullmann's Encyclopedia of Industrial Chemistry, Sixth Edition* 1999 *Electronic Release.* Wiley-VCH; D. Dieterich in *Houben-Weyl, Methoden der Organischen Chemie*, vol. E20, H. Bartl, J. Falbe (eds.), Georg Thieme Verlag, Stuttgart 1987, p. 1641 ff.; D. Dieterich, Prog. Org. Coat. 9 (1981) 281-330; J. W. Rosthauser, K. Nachtkamp, Journal of Coated Fabrics 16 (1986) 39-79; R. Arnoldus, Surf. Coat. 3 (Waterborne Coat.) (1990), 179-98.

Emulsifier-free, self-emulsifying polyurethanes have been known for a considerable time. They contain chemically incorporated hydrophilic centers ensuring self-emulsifiability of the otherwise hydrophobic polyurethane backbone. In principle, a distinction is made between two different kinds of covalently bonded hydrophilic centers. These may on the one hand be ionic groups, such as carboxylate or sulfonate groups (electrostatic stabilization), or else, on the other hand, hydrophilic nonionic groups such as polyethylene oxides (steric stabilization).

Depending on the nature of the hydrophilic center, the polyurethane dispersions possess different characteristic properties. Ionically stabilized polyurethane dispersions are extremely stable to temperature rise, since the solubility of the salt groups they contain is virtually independent of temperature. Nonionically stabilized polyurethane dispersions, in contrast, owing to the decreasing water-solubility of the polyurethane oxide side chains on heating, coagulate even at temperatures of around 60° C.

In contrast to ionically stabilized polyurethane dispersions, they possess an extraordinary electrolyte stability and are stable even after freezing and thawing.

The incorporated hydrophilic centers, however, naturally lower considerably the water resistance of dried polyurethane dispersion films.

It is known, however, that through a combined incorporation of ionic and pendant nonionically hydrophilic groups it is possible to keep the overall number of hydrophilic centers substantially lower than would be possible using only one of the two, without detriment to good dispersing properties.

Ionic and nonionic hydrophilic groups also act synergistically here; in other words, the polyurethane dispersion stabilized in this way is stable both to frost and to heating and, moreover, still possesses electrolyte stability.

U.S. Pat. No. 3,905,929 B1 describes water-dispersible, purely nonionically stabilized polyurethanes having pendant polyalkylene oxide chains. The polyalkylene oxide side chains are incorporated via a diol component into the polyurethane main chain. Said component is prepared from a polyether itself prepared starting from monoalcohol, and consisting of predominantly ethylene oxide units and, where appropriate butylene oxide, styrene oxide or propylene oxide units, by reaction with a 3-10-fold excess of a diisocyanate and subsequent reaction with diethanolamine or comparable compounds. The excess diisocyanate is removed by distillation in order to suppress the formation of bisurethane before the final reaction step. The intention here is that the formation of bisurethane should be prevented solely by means of excess diisocyanate. A catalyst for increasing the selectivity of the addition of a hydroxyl group onto the isocyanate group, which is more reactive in each case, is not used here, however. According to U.S. Pat. No. 3,920,598 B1 a process is disclosed in which the polyethylene oxide chain is bonded covalently to a diisocyanate molecule via an allophanate or biuret bond.

DE 25 51 094 A1 discloses water-dispersible, emulsifier-free polyurethanes having terminal or pendant polyalkylene oxide polyether chains (nonionic hydrophilic groups) in conjunction with ionic hydrophilic centers, the ionic centers being quaternary ammonium, carboxylate or sulfonate ions in association with appropriate salt-forming counterions. The combined incorporation allows the overall number of hydrophilic groups to be kept substantially lower than would be possible using ionic or nonionic groups alone. The pendant polyether units, which are synthesized essentially from ethylene oxide units, but may also include propylene oxide, butylene oxide, styrene oxide or polytetrahydrofuran, are incorporated into the prepolymer here via a diol or diisocyanate component.

DE 26 51 505 C2 describes cationic water-dispersible polyurethane systems in conjunction with terminal or pendant polyalkylene oxide polyether chains, which are likewise incorporated into the prepolymer via a diol or diisocyanate component.

In both patents the effectiveness of the hydrophilic groups is defined exclusively by way of their number, not by way of their distribution in the prepolymer.

DE 23 14 512 A1 and DE 23 14 513 A1 disclose emulsifier-free aqueous polyurethanes which are stabilized exclusively nonionically via polyethylene oxide side chains, which are incorporated into the prepolymer via a diol component or diisocyanate component.

DE 27 30 514 A1 discloses electrolyte-stable aqueous solutions of polyurethane ionomers. The incorporation of hydrophilic polyether segments within the polyurethane chain, terminally or pendantly, results in protection against electrolytes at high ionic charges. Owing to the relatively high fraction of hydrophilic groups, the water resistance properties of cured films of these polyurethane systems are not particularly good.

DE 26 59 617 C2 discloses a process for preparing aqueous ionic polyurethane dispersions which are stable at room temperature, comprise water-soluble electrolytes, and have terminal or pendant ethylene oxide chains, and which as a result, although being less sensitive to frost and being less stable to electrolyte-containing additives such as pigments and fillers, for example, nevertheless have a high sensitivity to heat, owing to the dissolved electrolyte.

An improvement to the process described in DE 25 51 094 A1 is presented in DE 28 16 815 A1. Here are water-dispersible or water-soluble polyurethanes having terminal or pendant hydrophilic synthesis components, and containing not only sulfonate groups but also ethylene oxide units arranged within a polyether chain. In all of the aforementioned patents or published patent applications, the two hydrophilic moieties (ionic and nonionic) were incorporated separately from one another into the polyurethane chain.

Finally, DE 38 31 169 A1 and DE 38 31 170 A1 describe soluble or water-dispersible nonionic polyurethanes having polyethylene oxide side chains in combination with free, non-neutralized acid groups or free, non-neutralized tertiary amino groups, which is said to lead to increased storage stability.

As potential applications for the aqueous polyurethane systems described in the abovementioned patents and published patent applications there are cited, in general, binders for thin coatings or impregnating systems for a variety of materials such as, for example, textiles, wood, leather, metal, ceramic, etc.

In all cases, however, the required amount of incorporated hydrophilic ionic and nonionic components is relatively high if stable aqueous systems are to be obtained, which automatically entails a deterioration in water resistance and, in addition, has adverse consequences for the overall profile of properties of the polyurethane system. The reason for this is the uneven distribution of the hydrophilic polyalkylene oxide side chains along the polyurethane backbone, which is a consequence of the preparation process and which leads to an increased overall requirement for hydrophilic centers.

The processing properties as well, with these polyurethane systems in which the proportion of ionic to nonionic stabilization has not been optimally adjusted, are unacceptable, particularly in systems with mineral binders, such as cement-based leveling components, for example.

The object on which the present invention is based was therefore to develop electrosterically stabilized aqueous polyurethane dispersions having an optimized ratio between ionic and nonionic hydrophilic moieties and also even distribution along the polyurethane backbone for improving and modifying, primarily, mineral binders, said dispersions not having the stated disadvantages of the prior art but instead possessing improved material properties and application properties and at the same time being able to be prepared with due account taken of environmental, economic, and physiological aspects.

This object has been achieved in accordance with the invention by the provision of electrosterically stabilized aqueous polyurethane resins, which are obtainable by
a) preparing a hydrophilic and solvent-free macromonomer (A)(ii) with monomodal molecular mass distribution, wherein
  $a_1$) 50 to 100 parts by weight of a hydrophilic alkyl- and/or arylpolyalkylene glycol (A)(i) having a primary and/or secondary hydroxyl group which is reactive toward isocyanate groups and having a molecular mass of 250 to 5000 daltons are reacted with 1 to 100 parts by weight of a polyisocyanate (B)(i), consisting of at least one diisocyanate, polyisocyanate, polyisocyanate derivative or polyisocyanate homolog having two or more aliphatic or aromatic isocyanate groups of identical or different reactivity, optionally in the presence of a catalyst,
  $a_2$) the preadduct from stage $a_1$ is reacted completely with 0.5 to 200 parts by weight of a compound (C) having two or more primary and/or secondary amino groups and/or hydroxyl groups which are reactive toward isocyanate groups and having a molecular mass of 50 to 500 daltons, and also
b) by preparing the polyurethane dispersion, wherein
  $b_1$) 2 to 50 parts by weight of the hydrophilic and solvent-free macromonomer (A)(ii) with monomodal molecular mass distribution, having two or more hydroxyl groups which are reactive toward isocyanate groups and having a molecular mass of 500 to 5500 daltons, are reacted with 25 to 250 parts by weight of a polyisocyanate component (B)(ii) consisting of at least one polyisocyanate, polyisocyanate derivative or polyisocyanate homolog having two or more (cyclo)aliphatic or aromatic isocyanate groups, optionally with the addition of 0 to 50 parts by weight of a solvent component (D) and optionally in the presence of a catalyst,
  $b_2$) the polyurethane preadduct from stage $b_1$) is reacted with 50 to 100 parts by weight of a polymeric polyol (A)(iii) having two or more hydroxyl groups which are reactive toward isocyanate groups and having a molecular mass of 500 to 5000 daltons
and optionally
with 0.5 to 10 parts by weight of a low molecular mass polyol component (A)(iv) having 2 or more hydroxyl groups and a molecular weight of 50 to 499 daltons, optionally in the presence of a catalyst,
  $b_3$) the polyurethane preadduct from stage $b_2$) is reacted with 2 to 20 parts by weight of a low molecular mass, anionically modifiable polyol component (A)(v) having one, two or more hydroxyl groups which are reactive toward isocyanate groups and having one or more inert carboxylic acid and/or sulfonic acid groups, which by means of bases can be converted fully or partly into carboxylate and/or sulfonate groups, respectively, or are already in the form of carboxylate and/or sulfonate groups, and having a molecular mass of 100 to 1000 daltons, optionally in the presence of a catalyst,
  $b_4$) the polyurethane prepolymer from stage $b_3$), before or during dispersion in water, is admixed, for the purpose of full or partial neutralization of the acid groups, with 2 to 20 parts by weight of a neutralizing component (E),
  $b_5$) the optionally (partially) neutralized polyurethane prepolymer from stage $b_4$) is dispersed in 50 to 1500 parts by weight of water, which optionally further contains 0 to 100 parts by weight of a formulating component (F), and finally
  $b_6$) the (partially) neutralized polyurethane prepolymer dispersion from stage $b_5$) is reacted with 3 to 60 parts by weight of a chain extender component (G) and also, subsequently or simultaneously, with 0 to 30 parts by weight of a chain stopper component (H).

It has in fact surprisingly emerged that through the preparation and use of a hydrophilic and solvent-free macromonomer (A)(ii) with monomodal molecular mass distribution in accordance with reaction stages $a_1$) to $a_2$) in conjunction with a three-stage preparation process for the polyurethane prepolymer in accordance with reaction stages $b_1$) to $b_3$) the following advantages arise for the electrosterically stabilized polyurethane dispersions:
  no byproducts during the preparation of the macromonomer (A)(ii), owing to the specific composition of the hydrophilic alkyl- and/or arylpolyalkylene glycol (A)(i), which is selective toward polyisocyanates
  compatibility between nonionic stabilizer (macromonomer (A)(ii)) and polyurethane backbone even during the synthesis of the polyurethane prepolymer
  optimum arrangement/distribution of the nonionic stabilizer (macromonomer (A)(ii)) in the polyurethane polymer as a result of a three-stage preparation process for the polyurethane prepolymer
  overall very low stabilizer requirement (anionic+nonionic) and comparatively very low hydrophilicity
  no coagulation at pH 1-14
  true dispersion: high solids contents at low viscosity, owing to very low stabilizer requirement (anionic+nonionic) (cf. prior art: solutions: high viscosities at high solids contents, owing to very high stabilizer requirement)

completely VOC-free binders obtainable high long-term storage stability (cf. prior art: slow destabilization as a result of byproducts in nonionic stabilizers)

resistance to hydrolysis, and low-temperature flexibility, in comparison with acrylate-based binders for similar applications profile of properties, material properties, and processing characteristics are influenced positively as a result of innovative polymer structure, as compared with the prior art The electrosterically stabilized polyurethane dispersion of the invention is defined by its multistage preparation process. In reaction stage a) first of all, a hydrophilic and solvent-free macromonomer (A)(ii) with monomodal molecular mass distribution is prepared, and is then reacted further, in reaction stage b), to give a low-solvent or solvent-free electrosterically stabilized polyurethane dispersion.

This process is carried out, employing the techniques customary in polyurethane chemistry, by reacting, in reaction stage $a_1$), 50 to 100 parts by weight of a hydrophilic alkyl- and/or arylpolyalkylene glycol (A)(i) having a primary and/or secondary and/or tertiary hydroxyl group which is reactive toward isocyanate groups and having a molecular mass of 250 to 5000 daltons with 1 to 100 parts by weight of a polyisocyanate (B)(i), consisting of at least one diisocyanate, polyisocyanate, polyisocyanate derivative or polyisocyanate homolog having two or more (cyclo)aliphatic or aromatic isocyanate groups of identical or different reactivity, optionally in the presence of a catalyst, in the absence of solvents, the reaction-conditions and the selectivities of components (A)(i) and (B)(i) being chosen such that only one isocyanate group of component (B)(i) reacts with component (A)(i). The preparation of the polyurethane preadduct in reaction stage $a_1$) is preferably accomplished by adding or metering in component (A)(i) within a period of a few minutes to a few hours to component (B)(i) or, alternatively, by adding or metering in component (B)(i) within a period of a few minutes to a few hours to component (A)(i).

In the subsequent reaction stage $a_2$) the uniform preadduct from stage $a_1$) is reacted completely with 0.5 to 200 parts by weight of a compound (C) having two or more primary and/or secondary amino groups and/or hydroxyl groups which are reactive toward isocyanate groups and having a molecular mass of 50 to 500 daltons in the absence of solvents, the reaction conditions and the selectivity of component (C) being chosen such that only one reactive group of component (C) reacts with the free isocyanate group(s) of the preadduct. Owing to the absence of unwanted byproducts, which might arise as a result of the addition of two or more molecules of (A)(i) to one molecule of (B)(i) in stage $a_1$) and, accordingly, by addition of two or more molecules of (C) to one molecule of (B)(i) in stage $a_2$), component (A)(ii) has a monomodal molecular mass distribution.

This has been shown explicitly by means of MALDI-TOF investigations. In contrast to the prior art already cited, therefore, besides the desired macromonomer (A)(ii), there are no byproducts in the form of external emulsifiers and crosslinkers, which would lead to a distinct deterioration in the quality of the resultant polyurethane dispersion product. The former are not incorporated into the polyurethane polymer and so reduce the stability of the dispersion; the latter lead to excessive crosslinking in the polyurethane polymer and so likewise reduce the stability of the dispersion. Since both byproducts occur in each case, their effects undergo mutual intensification. Because of this fact, the prior art products are also of only limited suitability for chemical applications in the construction sector. Since the formation of byproducts is very heavily dependent on the operating regime, there must also be strong doubts with regard to reproducibility in the systems known from the literature.

In terms of the reaction conditions, the conduct of reaction stages $a_1$) and $a_2$) is relatively uncritical. The reaction mixture in reaction stages $a_1$) and $a_2$) is stirred under an inert gas atmosphere, at 10 to 30° C., preferably at 15 to 25° C., utilizing the exothermic heat given off by the polyaddition reaction, until the calculated or theoretical NCO content is attained. The reaction times required are situated in the range from a few minutes to a few hours, and are critically influenced by reaction parameters such as the reactivity of the components, their stoichiometry, and the temperature.

The NCO/OH equivalent ratio in stage $a_1$) is set at 1.9 to 2.1 and the NCO/OH+NH equivalent ratio in stage $a_2$) is set at 0.95 to 1.05.

In the subsequent reaction stage $b_1$) 2 to 50 parts by weight of the hydrophilic and solvent-free macromonomer (A)(ii) with monomodal molecular mass distribution, having two or more hydroxyl groups which are reactive toward isocyanate groups and having a molecular mass of 500 to 5500 daltons, are reacted with 25 to 250 parts by weight of a polyisocyanate component (B)(ii) consisting of at least one polyisocyanate, polyisocyanate derivative or polyisocyanate homolog having two or more (cyclo)aliphatic or aromatic isocyanate groups, with or without the addition of 0 to 50 parts by weight of a solvent component (D), and optionally in the presence of a catalyst. The polyurethane preadduct is preferably prepared in reaction stage $b_1$) by adding or metering in component (A)(ii) within a period of a few minutes to a few hours to component (B)(ii) or, alternatively, by adding or metering in component (B)(ii) within a period of a few minutes to a few hours to component (A)(ii). In the subsequent reaction stage $b_2$) the polyurethane preadduct from stage $b_1$) is reacted with 50 to 100 parts by weight of a polymeric polyol (A)(iii) having two or more hydroxyl groups which are reactive toward isocyanate groups and having a molecular mass of 500 to 5000 daltons and, optionally, with 0.5 to 10 parts by weight of a low molecular mass polyol component (A)(iv) having 2 or more hydroxyl groups and a molecular weight of 50 to 499 daltons, optionally in the presence of a catalyst. Subsequently, in reaction stage $b_3$), the polyurethane preadduct from stage $b_2$) is reacted with 2 to 20 parts by weight of a low molecular mass, anionically modifiable polyol component (A)(v) having one, two or more hydroxyl groups which are reactive toward isocyanate groups and having one or more inert carboxylic acid and/or sulfonic acid group(s) which by means of bases can be converted fully or partly into carboxylate and/or sulfonate groups or are already in the form of carboxylate and/or sulfonate groups, and having a molecular mass of 100 to 1000 daltons, optionally in the presence of a catalyst. The polyurethane preadducts from reaction stages $b_1$) and $b_2$) that are used in reaction stages $b_2$) and $b_3$), respectively, may, given an appropriate operating regime or in the case of incomplete reaction, also contain free hydroxyl groups besides isocyanate groups and/or polyisocyanate monomers.

The conduct of reaction stages $b_1$), $b_2$), and $b_3$) is relatively uncritical with regard to the reaction conditions. In reaction stages $b_1$), $b_2$) and $b_3$) the reaction mixture is stirred under an inert gas atmosphere at 60 to 120° C., preferably at 80 to 100° C., utilizing the exothermic heat given off by the polyaddition reaction, until the calculated or theoretical NCO content is attained. The required reaction times are situated in the range of a few hours and are critically influenced by reaction parameters such as the reactivity of the components, their stoichiometry, and the temperature.

The NCO/OH equivalent ratio of components (A)(i), (A)(ii), (A)(iii), (A)(iv), (A)(v), and (B)(ii) in stage b) is set at a value of 1.25 to 2.5, preferably 1.4 to 2.0.

The reaction of components (A), (B) and (C) in stages $a_1$), $b_1$) and $b_3$) may take place in the presence of a catalyst which is customary for polyaddition reactions on polyisocyanates. Where needed, these catalysts are added in amounts of 0.01% to 1% by weight, based on components (A) and (B). Conventional catalysts for polyaddition reactions on polyisocyanates are, for example, dibutyltin oxide, dibutyltin dilaurate (DBTL), triethylamine, tin(II) octoate, 1,4-diazabicyclo[2.2.2]octane (DABCO), 1,4-diazabicyclo[3.2.0]-5-nonene (DBN), and 1,5-diazabicyclo[5.4.0]-7-undecene (DBU).

Component (A)(i) is composed of a hydrophilic alkyl- and/or arylpolyalkylene glycol having a primary and/or secondary hydroxyl group which is reactive toward isocyanate groups and having a molecular mass of 250 to 5000 daltons. As suitable hydrophilic alkyl- and/or arylpolyalkylene glycols, it is possible to use hydrolysis-stable copolymers and/or random copolymers and/or block copolymers composed of 90% to 10% by weight of ethylene oxide and 10% to 90% by weight of further alkylene oxides having 4 to 30 carbon atoms per alkylene oxide, having a primary and/or secondary and/or tertiary hydroxyl group, preferably monofunctional alkyl poly(ethylene oxide-co/ran-alkylene oxide) and/or alkyl poly(ethylene oxide-block-alkylene oxide) and/or sodium sulfonatopropyl poly(ethylene oxide-co/ran-alkylene oxide) and/or sodium sulfonatopropyl poly(ethylene oxide-block-alkylene oxide) having a secondary or tertiary hydroxyl group, composed of 90% to 10% by weight of ethylene oxide and 10% to 90% by weight of a further alkylene oxide. Preferred alkylene oxides are propylene oxide, butylene oxide, dodecyl oxide, isoamyl oxide, oxetane, substituted oxetanes, α-pinene oxide, styrene oxide, tetrahydrofuran or further aliphatic or aromatic alkylene oxides having 4 to 30 carbon atoms per alkylene oxide, or mixtures thereof.

Component (A)(iii) is composed of a polymeric polyol having 2 or more hydroxyl groups which are reactive toward polyisocyanates and having an average molecular mass (number average) of 500 to 5000 daltons. As suitable polymeric polyols it is possible to use linear and/or difunctional polyalkylene glycols, aliphatic or aromatic polyesters, polycaprolactones, polycarbonates, α,ω-polymethacrylatediols, α,ω-dihydroxyalkylpolydimethylsiloxanes, hydroxy-functional macromonomers, hydroxy-functional telecheles, hydroxy-functional epoxy resins or suitable mixtures thereof. Preference is given to using polyalkylene glycols. Examples of suitable polyalkylene glycols are polypropylene glycols, polytetramethylene glycols or polytetrahydrofurans, hydrophobically modified block copolymers composed of hydrolysis-stable block copolymers with ABA, BAB or $(AB)_n$ structure, A representing a polymer segment having hydrophobizing properties and B representing a polymer segment based on polypropylene oxide, having an average molecular mass (number average) of 1000 to 3000 daltons. Preferred polymer segments A are polybutylene oxide, polydodecyl oxide, polyisoamyl oxide, polyoxetane, substituted polyoxetanes, poly-α-pinene oxide, polystyrene oxide, polytetramethylene oxide, further aliphatic or aromatic polyoxyalkylenes having 4 to 30 carbon atoms per alkylene oxide, α,ω-polymethacrylatediols, α-ω-dihydroxyalkylpolydimethylsiloxanes, macromonomers, telecheles or mixtures thereof.

Component (A)(iv) is composed of a low molecular mass polyol having two or more hydroxyl groups which are reactive toward polyisocyanates and having an average molecular mass of 50 to 499 daltons. As suitable polyols of low molecular mass it is possible for example to use 1,2-ethanediol or ethylene glycol, 1,2-propanediol or 1,2-propylene glycol, 1,3-propanediol or 1,3-propylene glycol, 1,4-butanediol or 1,4-butylene glycol, 1,6-hexanediol or 1,6-hexamethylene glycol, 2-methyl-1,3-propanediol, 2,2-dimethyl-1,3-propanediol or neopentyl glycol, 1,4-bis(hydroxymethyl)cyclohexane or cyclohexanedimethanol, 1,2,3-propanetriol or glycerol, 2-hydroxymethyl-2-methyl-1,3-propanol or trimethylolethane, 2-ethyl-2-hydroxymethyl-1,3-propanediol or trimethylolpropane, 2,2-bis(hydroxymethyl)-1,3-propanediol or pentaerythritol.

Component (A)(v) is composed of a low molecular mass, anionically modifiable polyol having one, two or more hydroxyl groups which are reactive toward isocyanate groups and having one or more inert carboxylic acid and/or sulfonic acid groups, which by means of bases can be converted fully or partly into carboxylate or sulfonate groups or are already in the form of carboxylate and/or sulfonate groups, and having a molecular mass of 100 to 1000 daltons. As low molecular mass, anionically modifiable polyols it is possible for example to use 2-hydroxymethyl-3-hydroxypropanoic acid or dimethylolacetic acid, 2-hydroxymethyl-2-methyl-3-hydroxypropanoic acid or dimethylolpropionic acid, 2-hydroxymethyl-2-ethyl-3-hydroxypropanoic acid or dimethylolbutyric acid, 2-hydroxymethyl-2-propyl-3-hydroxypropanoic acid or dimethylolvaleric acid, citric acid, tartaric acid, [tris(hydroxymethyl)methyl]-3-aminopropanesulfonic acid (TAPS, Raschig GmbH), building blocks based on 1,3-propane sulfone (Raschig GmbH) and/or 3-mercaptopropanesulfonic acid, sodium salt (MPS, Raschig GmbH). These building blocks may optionally also contain amino groups instead of hydroxyl groups. Preference is given to using bishydroxyalkanecarboxylic acids having a molecular mass of 100 to 200 daltons and particularly to 2-hydroxymethyl-2-methyl-3-hydroxypropanoic acid or dimethylolpropionic acid (trade name DMPA[?] from Trimet Technical Products, Inc.).

Components (B)(i) and B(ii) are composed of at least one polyisocyanate, polyisocyanate derivative or polyisocyanate homolog having two or more aliphatic or aromatic isocyanate groups. Particularly suitable are the polyisocyanates which are well known in polyurethane chemistry, or combinations thereof. As suitable aliphatic polyisocyanates it is possible for example to use 1,6-diisocyanatohexane (HDI), 1-isocyanato-5-isocyanatomethyl-3,3,5-trimethylcyclohexane or isophorone diisocyanate (IPDI), bis(4-isocyanatocyclohexyl)methane ($H_{12}$MDI), 1,3-bis(1-isocyanato-1-methylethyl)benzene (m-TMXDI) or technical isomer mixtures of the individual aromatic polyisocyanates. As suitable aromatic polyisocyanates it is possible for example to use 2,4-diisocyanatotoluene or toluene diisocyanate (TDI), bis(4-isocyanatophenyl)methane (MDI) and, if desired, its higher homologs (polymeric MDI) or technical isomer mixtures of the individual aromatic polyisocyanates. Also suitable in principle, moreover, are the "paint polyisocyanates" based on bis(4-isocyanato-cyclohexyl)methane ($H_{12}$MDI), 1,6-diisocyanatohexane (HDI) and/or 1-isocyanato-5-isocyanatomethyl-3,3,5-trimethylcyclohexane (IPDI). The term "paint polyisocyanates" characterizes derivatives of these diisocyanates which contain allophanate, biuret, carbodiimide, isocyanurate, uretdione or urethane groups and in which the residual monomer diisocyanate content has been reduced in accordance with the prior art to a minimum. In addition it is also possible to use modified polyisocyanates which are obtainable, for example, by hydrophilic modification of "paint polyisocyanates" based on 1,6-diisocyanatohexane (HDI). In the case of component (B)(i) the aliphatic polyisocyanates are preferred over the aromatic polyisocyanates. Furthermore, polyisocyanates having isocyanate groups of different reactivity are preferred. In the case of component (B)(ii), preference is given to toluene 2,4-diisocyanate, isomer mixtures of toluene 2,4-diisocyanate and toluene 2,6-diisocyanate, or isomer mixtures of isophorone diisocyanate.

It is preferred to use polyisocyanates having isocyanate groups of different reactivity, in order to give narrower molecular mass distributions with reduced polydispersity. Accordingly, preference is given to polyurethane prepolymers with a linear structure which are composed of difunctional polyol and polyisocyanate components.

According to one preferred embodiment a monofunctional polyalkylene glycol is used as component (A)(i) and an at least difunctional polyisocyanate is used as component (B)(i).

Component (C) consists of a compound having two or more primary and/or secondary amino groups and/or hydroxyl groups which are reactive toward isocyanate groups and having a molecular mass of 50 to 500 daltons. Suitable compounds which can be used include, for example, ethanolamine, diethanolamine, ethylenediamine, diethylenetriamine, N-(2-aminoethyl)-2-aminoethanol, and trimethylolpropane. Preference is given to using diethanolamine.

To reduce the viscosity of the polyurethane prepolymers or to improve the coalescence of the polyurethane dispersion it is possible to add organic solvents during or after the preparation in reaction stage b). Preferably the polyurethane dispersion contains less than 10% by weight of organic solvents. According to one particularly preferred embodiment the polyurethane dispersion is in solvent-free form.

The solvent component (D) consists of an organic solvent which is inert toward polyisocyanates and is preferably fully or partly miscible with water, said solvent remaining in the polyurethane dispersion following the preparation or being wholly or partly removed again by distillation. Suitable solvents which can be used include, for example, high-boiling, hydrophilic organic solvents such as N-methylpyrrolidone, diethylene glycol dimethyl ether, dipropylene glycol dimethyl ether (Proglyde DMM® from Dow), low-boiling solvents such as acetone or butanone, or any desired mixtures thereof. It is preferred to use a high-boiling, hydrophilic solvent such as N-methylpyrrolidone which following the preparation remains in the dispersion and functions as a coalescence assistant.

The viscosity of the polyurethane prepolymers is relatively low and largely independent of the structure of the polyol and polyisocyanate components used. There is generally no need to add solvents to reduce the viscosity or to improve the dispersing properties of the polyurethane prepolymers. The special structure of the prepolymers enables products to be prepared which have extraordinarily high solids contents. Moreover, owing to the even distribution of the carboxylate and/or sulfonate groups over the polyurethane polymer, only very low charge densities are required for stabilizing the corresponding polyurethane dispersions.

In reaction stage $b_4$), the polyurethane prepolymer from the preceding reaction stage $b_3$), before or during its dispersion in 50 to 1500 parts by weight of water, is reacted with 2 to 20 parts by weight of a neutralizing component (E) for partial or complete neutralization of the carboxylic acid and/or sulfonic acid groups (direct or indirect neutralization). In the case of direct neutralization the neutralizing component (E) is introduced into the polyurethane prepolymer before it is dispersed in water; in the case of indirect neutralization the neutralizing component (E) is introduced in the water prior to dispersion. If necessary it is also possible to employ a combination of direct and indirect neutralization.

Reaction stage $b_4$) is carried out preferably at a temperature of 40 to 60° C., in particular at approximately 50° C.

The neutralizing component (E) is composed of one or more bases which serve for complete or partial neutralization of the carboxylic acid and/or sulfonic acid groups. Where component (A)(v) is already in the form of its salts, there is no need for the neutralizing component (E). Suitable bases which can be used include, for example, tertiary amines such as N,N-dimethylethanolamine, N-methyldiethanolamine, triethanolamine, N,N-dimethylisopropanolamine, N-methyldiisopropanolamine, triisopropylamine, N-methylmorpholine, N-ethylmorpholine, triethylamine, ammonia or alkali metal hydroxides such as lithium hydroxide, sodium hydroxide or potassium hydroxide. Preference is given to using alkali metal hydroxides, and especially sodium hydroxide.

The neutralizing component (E) is added in an amount such that the degree of neutralization, based on the free carboxylic acid and/or sulfonic acid groups of the polyurethane prepolymer, is 25 to 100 equivalent %, preferably 50 to 100 equivalent %. In the course of the neutralization, from the carboxylic acid and/or sulfonic acid groups, carboxylate and/or sulfonate groups are formed which serve for anionic modification and/or stabilization of the polyurethane dispersion.

The optionally (partially) neutralized polyurethane prepolymer from reaction stage $b_4$) is dispersed in the subsequent reaction stage $b_5$) in 50 to 1500 parts by weight of water, which optionally also contains 0 to 100 parts by weight of a formulating component (F) (in situ formulation).

The formulating component (F) is composed of defoamers, devolatilizers, lubricity and flow additives, radiation-curing additives, dispersing additives, substrate wetting additives, hydrophobizers, rheological additives such as polyurethane thickeners, coalescence assistants, matting agents, adhesion promoters, antifreeze agents, antioxidants, UV stabilizers, bactericides, fungicides, other polymers and/or polymer dispersions, and also fillers, pigments, matting agents or an appropriate combination thereof. The individual formulating ingredients are to be regarded as being inert.

The reaction stage $b_5$) is carried out preferably at a temperature of 40 to 60° C., in particular at approximately 50° C.

In the course of the dispersing procedure the polyurethane prepolymer is transferred to the dispersing medium and forms a polyurethane prepolymer dispersion. The neutralized polyurethane prepolymer forms micelles which on their surface have stabilizing carboxylate and/or sulfonate groups and also polyalkylene oxide chains and in their interior have reactive isocyanate groups. All cationic counterions to the anionic carboxylate and/or sulfonate groups are in solution in the dispersing medium. The terms "dispersing" and "dispersion" indicate that in addition to dispersed components with a micellar structure it is also possible for solvated and/or suspended components to be present. For the transfer of the polyurethane prepolymer to the aqueous phase it is possible either to stir the polyurethane prepolymer into the dispersing medium or to stir the dispersing medium into the polyurethane prepolymer (inverse method).

The (partially) neutralized polyurethane prepolymer dispersion from reaction stage $b_5$) is reacted in the subsequent reaction stage $b_6$) with 3 to 60 parts by weight of a chain extender component (G) and also, subsequently or simultaneously, with 0 to 30 parts by weight of a chain stopper component (H).

The reaction stage $b_6$) is carried out preferably at a temperature of 30 to 50° C., in particular at approximately 40° C.

The chain extender component (G) is composed of a polyamine having two or more amino groups which are reactive toward polyisocyanates. Suitable polyamines which can be used include, for example, adipic dihydrazide, ethylenediamine, diethylenetriamine, triethylenetetramine, tetraethylenepentamine, pentaethylenehexamine, dipropylenetriamine, hexamethylenediamine, hydrazine, isophoronediamine, N-(2-aminoethyl)-2-aminoethanol, Jeffamines® (polyoxy-alkylenamines) from Huntsman Corporation, adducts of salts of 2-acrylamido-2-methylpropane-1-sulfonic acid (AMPS) and ethylenediamine, adducts of salts of (meth)acrylic acid and ethylenediamine, adducts of 1,3-propane sulfone and ethylenediamine, or any desired combinations of these polyamines. Preference is given to using difunctional primary amines, and especially ethylenediamine.

The chain extender component (G) is added in an amount such that the degree of chain extension, based on the free isocyanate groups of the polyurethane prepolymer, is 50 to 100 equivalent %, preferably 70 to 80 equivalent %. The chain extender component (G) can be diluted in fractions of the water withdrawn beforehand, in a weight ratio of 1:1 to 1:10, in order to suppress the additional exothermic heat given off by the hydration of the amines.

The chain stopper (or chain terminator) component (H) is composed of a monoamine having one amino group which is reactive toward polyisocyanates. Suitable monoamines which can be used include ethylamine, diethylamine, n-propylamine, di-n-propylamine, isopropylamine, diisopropylamine, n-butylamine, di-n-butylamine, ethanolamine, diethanolamine, isopropanolamine, diisopropanolamine, morpholine, piperidine, pyrrolidine or any desired combination of these monoamines. Preference is given to using monofunctional primary amines, and especially isopropylamine.

The chain stopper component (H) is added in an amount such that the degree of chain termination, based on the free isocyanate groups of the polyurethane prepolymer, is 0 to 50 equivalent %, preferably 20 to 30 equivalent %. The chain stopper component (H) can be diluted in fractions of the water withdrawn beforehand, in a weight ratio of 1:1 to 1:10, in order to suppress the additional exothermic heat given off by the hydration of the amines.

The chain extension and chain termination of the polyurethane prepolymer dispersion leads to a buildup of molecular mass within the micelles and to the formation of a polyurethane-polyurea dispersion of high molecular mass. The chain extender component (G) and the chain stopper component (H) react with reactive isocyanate groups substantially more rapidly than water.

Following the reaction stage $b_6$), any free isocyanate groups still present are fully chain-extended with water.

The amount of ethylene oxide groups in the polyurethane polymer formed from components (A), (B), (C), (E), (G), and (H) is set at 0.5% to 10% by weight, preferably at 2% to 5% by weight.

The solids content of polyurethane polymer composed of components (A), (B), (C), (E), (G), and (H) is set at 30% to 70% by weight, preferably at 50% to 55% by weight, based on the total amount of the polyurethane dispersion.

The amount of carboxylate and/or sulfonate groups in the polyurethane polymer formed from components (A), (B), (C), (E), (G), and (H) is set at 5 to 25 meq·$(100\ g)^{-1}$, preferably at 10 to 20 meq·$(100\ g)^{-1}$, and the acid number at 5 to 30 meq KOH·$g^{-1}$, preferably at 10 to 25 meq KOH·$g^{-1}$.

The average particle size (AF-FFF) of the micelles of the polyurethane dispersion is 50 to 500 nm, preferably 100 to 400 nm.

The average molar mass (number average) of the polyurethane polymers formed from components (A), (B), (C), (E), (G), and (H) is 25 000 to 500 000 daltons.

In one particularly preferred embodiment the polyurethane dispersion is prepared by means of the High Solids Zero VOC Process (cf. WO 99/50 325 and DE 199 49 971). This process represents a universal method of producing custom-tailored polyurethane dispersions. The low level of technical requirements of the process and the complete renunciation of volatile and/or nonvolatile organic solvents permit high space/time yields in conjunction with low costs. The performance levels of the polyurethane dispersions of the invention in terms of absence of solvent, solids content, and material properties are remarkable. Also deserving of emphasis are the simplicity and reproducibility of the process and the storage stability of the products.

The result of the ideally linearly segmented structure of the polyurethane polymers is, intermolecularly, a very pronounced and regular domain structure made up of hard segments and soft segments. Hard segments are composed of structural elements having rigid urethane and urea groups and also short-chain diols, which exert a strong interchenary interaction. Soft segments are composed of flexible structural elements with carbonate, ester, and ether groups, which exert a weak interchenary interaction. By virtue of their preparation process the polyurethane dispersions have an ideally linearly segmented structure. The expression "ideally linearly segmented structure" here indicates that the polyurethane polymers possess a linear structure and contain all structural components in a regular arrangement and sequence, resulting in the particular material properties of the polyurethane dispersions. Elongation and tensile strength can be varied almost arbitrarily over wide ranges.

The present invention further provides for the use of electrosterically stabilized aqueous polyurethane resins in chemical products for the construction industry.

The electrosterically stabilized aqueous polyurethane resins proposed in accordance with the invention are suitable for use as binders in liquid and pasty construction products, in the form of (a) synthetic resin plasters, (b) bitumen compounds and asphalt, and (c) individual components of external insulation and finishing systems, optionally with the addition of mineral binders.

The electrosterically stabilized aqueous polyurethane resins proposed in accordance with the invention are additionally suitable for use as a modifying component for mineral construction products, in the form of (a) mortar additive dispersions for screeds, trowel-applied flooring compounds, and leveling components, (b) mortar additive dispersions for construction adhesives, tile adhesives and EIFS adhesives, (c) dispersions as mortar additives for 2-component grouts, (d) mortar additive dispersions for concrete repair systems, and (e) polymer dispersions as additives in concrete construction work.

The electrosterically stabilized aqueous polyurethane resins proposed in accordance with the invention are likewise suitable for use as binders in formulations—optionally comprising mineral binders—for sport floor coverings and tennis court. surfacings, in the form of (a) binders for elastic layers, composed of rubber granules or of fibers with or without adjuvants,
(b) adhesion promoters or primers for the base surfaces of sport floor coverings,
(c) spray coatings, with or without texturing fillers, for application to rigid or elastic base surfaces,
(d) leveling coatings for application to rigid or elastic base surfaces,
(e) troweling compounds for sealing the pores of rigid or elastic base surfaces,
(f) adhesives for bonding prefabricated elastic layers,
(g) sealer coatings, with or without pigments, and
(h) line paints.

The electrosterically stabilized aqueous polyurethane resins proposed in accordance with the invention are suitable, furthermore, for use as binders in formulations—optionally comprising mineral binders—for crack-bridging coating systems, in the form of a) prime, float or top layers, and also spray coatings or sealer coatings on preferably primed surfaces of built structures,
b) (optionally flame-retarded) roof coatings or roof-painting materials, and
c) (optionally flame-retarded) seals for built-structures in opencast or underground mining.

In the context of the stated applications the electrosterically stabilized aqueous polyurethane resins proposed in accordance with the invention are particularly suitable for use as binders for producing optionally cement-based, aqueous high-build coatings.

The electrosterically stabilized aqueous polyurethane resins proposed in accordance with the invention can be used in the construction sector, additionally, as binders for coatings, sealants, printing inks, paints and varnishes, primers, adhesives, membranes for the surfaces of mineral building materials, such as concrete, gypsum, ceramic, clay, and cement, and also for the surfaces of glass, rubber, wood and woodbase materials, plastic, metal, paper, and composites.

Furthermore, the electrosterically stabilized aqueous polyurethane resins proposed in accordance with the invention are suitable for use as binders for coating real and synthetic leathers and also paper and cardboard articles and for producing synthetic leathers.

The electrosterically stabilized aqueous polyurethane resins proposed in accordance with the invention can be employed in one-, two- or multi-component form, it being possible for the further components to comprise formulating ingredients and/or hardeners. In this context it is possible to use the polyurethane resins of the invention in combination with formulating ingredients and, optionally, further polymers in the form of redispersible powders or as binders in amounts of 0.5% to 75% by weight, based on the fully formulated end product.

It is in principle also possible, within formulations, to combine the electrosterically stabilized aqueous polyurethane resins of the invention with aqueous or nonaqueous binders and/or formulations based on the polyurethane resins of the invention with formulations based on aqueous or nonaqueous binders. The term "aqueous or nonaqueous binders" here denotes water-based polyurethanes, polymer dispersions, redispersible polymer powders or nonaqueous, solvent-containing or solvent-free and optionally reactive polymers.

The individual formulating ingredients are fillers, pigments, plasticizers, fiber materials, defoamers, devolatilizers, lubricity and flow additives, dispersing additives, substrate wetting additives, hydrophobizers, rheological assistants, adhesion promoters, flame retardants, antifreeze agents, antioxidants, UV stabilizers, and preservatives.

The formulating ingredients can be introduced during and/or after the preparation of the polyurethane dispersions. In the case of a polyurethane dispersion formulated in situ the formulating step is integrated into the preparation process of the binder, i.e., the (inert) formulating ingredients are already included, in whole or in part, in the initial charge in the dispersing medium.

The electrosterically stabilized aqueous polyurethane resins proposed in accordance with the invention are applied using the known methods, such as flow coating, casting, knife coating, spraying, brushing, dipping, and rolling, for example.

The examples which follow are intended to illustrate the invention in more detail.

EXAMPLES

Example A.1

A.1.1 Methylpoly(ethylene oxide-co/ran-propylene oxide)

102.2 g (1 mol) of methyldiglycol and 7.0 g (0.1 mol) of potassium methoxide were charged to a reactor. Following thorough flushing with ultrapure nitrogen, the initial charge was heated to 115° C. and a mixture of 437 g (9.93 mol) of ethylene oxide and 173 g (2.98 mol) of propylene oxide was added over the course of 20 minutes. After a subsequent reaction period until constant pressure, again a mixture of 437 g (9.93 mol) of ethylene oxide and 173 g (2.98 mol) of propylene oxide was metered in over the course of 20 minutes. Following complete introduction of the monomer mixture, the temperature was held at 115° C. until a constant manometer pressure indicated the end of the subsequent reaction. Finally, at 80 to 90° C., the unreacted residual monomers were removed under reduced pressure. The product obtained was neutralized using phosphoric acid and the water was removed by distillation, the potassium phosphate formed being removed by filtration together with a filter aid.

The molecular weight from the determination of the hydroxyl number, with an assumed functionality of 1, was M=1140 g/mol.

A.1.2 Building Block Synthesis ("dispersing diol")

A four-neck flask equipped with KPG stirrer, reflux condenser, internal thermometer and nitrogen blanketing was charged with 0.1 mol of pure tolylene 2,4-diisocyanate (TDI) (Desmodur T 100, Bayer AG) under nitrogen and this initial charge was cooled to approximately 15-20° C. Crystallization of tolylene 2,4-diisocyanate (TDI) should absolutely be prevented. Following the addition of two drops of dibutyltin dilaurate (DBTL) as catalyst an equimolar amount of methylpoly(ethylene oxide-co/ran-propylene oxide) was slowly added dropwise over the course of approximately two hours, with cooling. After the end of the dropwise addition the batch was stirred at the same temperature for a further two hours until the desired NCO value was reached. The preadduct was then slowly added dropwise, with cooling, to an equimolar amount of diethanolamine (DEA). The reaction is at an end when the NCO value has dropped to zero.

Example A.2

Preparation took place in analogy to example A.1.2. The hydrophilic alkylpolyalkylene glycol used was sodium sulfonatopropylpoly(ethylene oxide-co/ran-propylene oxide) (Tego Chemie Service GmbH) having a molecular weight of M=1275 g/mol.

Example B.1

Solvent-free Electrosterically Stabilized Polyurethane Dispersion Based on PPG 2000 and Building Block ("dispersing diol") from Example A.1

In a four-neck flask equipped with KPG stirrer, reflux condenser, thermometer and nitrogen blanketing first of all a mixture of 9.02 g of building block (from example A.1) and 41.52 g of isophorone diisocyanate (Vestanat® IPDI, Degussa AG) is stirred at 45° C. for about 30 minutes under nitrogen blanketing in the presence of 0.1 g of dibutyltin dilaurate (DBTL) as catalyst. Following the addition of 100.00 g of polypropylene glycol having a hydroxyl number of 56.1 mg KOH·g$^{-1}$ (Arco Arcol PPG 2000 from Arco Chemical) and 0.58 g of 1,4-butanediol to the preadduct the mixture is stirred at 80-90° C. for a further 1.5 h under nitrogen blanketing. Subsequently 4.11 g of finely ground dimethylolpropionic acid (trade name DMPA® from Mallinckrodt) are added and the mixture is stirred at unchanged temperature for a further 2.5 h until the calculated NCO content is reached (theoretical: 5.06% by weight, NCO/OH=2.00). The course of the reaction is monitored by acidimetry. After cooling to 70° C., the prepolymer is then dispersed with vigorous stirring in 130.59 g of water to which, beforehand, 21.44 g (70 equivalent % neutralization) of aqueous sodium hydroxide solution (4% by weight) have been added, and this mixture is subsequently stirred for approximately 15 minutes. Thereafter, to construct the polyurethane dispersion, chain extension takes place with 18.83 g (70 equivalent %) of an 80% by weight solution of Jeffamine® D-230 (from Huntsman) in water. This gives a stable polyurethane dispersion having the following characteristics:

| | |
|---|---|
| Appearance | milky white |
| Solids content | 52.5% by weight |
| Charge density | 18.0 meq · (100 g)$^{-1}$ |
| EO content of prepolymer | 3.5% by weight |
| pH | 6.8 |
| Viscosity - Brookfield | 170 mPa · s (20° C.) |
| Average particle diameter | 120-160 nm |

Example B.2

Solvent-free Electrosterically Stabilized Polyurethane Dispersion Based on a Hydrophobicized Polyalkylene Oxide (poly(propylene oxide)-block-poly(butylene oxide)-block-poly(propylene oxide)) and Building Block ("dispersing diol") from Example A.1

Preparation took place in the same way as for example B.1 but replacing the polypropylene glycol by a hydrophobicized polypropylene glycol containing 42% by weight of a polybutylene oxide middle block and having a hydroxyl number of 53.1 mg KOH·g$^{-1}$ (Tego Chemie Service GmbH).

| | |
|---|---|
| Appearance | milky white |
| Solids content | 52.5% by weight |
| Charge density | 18.2 meq · (100 g)$^{-1}$ |
| EO content of prepolymer | 3.5% by weight |
| pH | 6.8 |
| Viscosity - Brookfield | 175 mPa · s (20° C.) |
| Average particle diameter | 120-160 nm |

Example B.3

Solvent-free Electrosterically Stabilized Polyurethane Dispersion Based on PPG 2000 and Building Block ("dispersing diol") from Example A.2

In a four-neck flask equipped with KPG stirrer, reflux condenser, thermometer and nitrogen blanketing first of all a mixture of 10.18 g of building block (from example A.2) and 37.77 g of isophorone diisocyanate (Vestanat® IPDI, Degussa AG) is stirred at 45° C. for about 30 minutes under nitrogen blanketing in the presence of 0.1 g of dibutyltin dilaurate (DBTL) as catalyst. Following the addition of 100.00 g of polypropylene glycol having a hydroxyl number of 56.1 mg KOH·g$^{-1}$ (Arco Arcol PPG 2000 from Arco Chemical) and 0.58 g of 1,4-butanediol to the preadduct the mixture is stirred at 80-90° C. for a further 1.5 h under nitrogen blanketing. Subsequently 2.98 g of finely ground dimethylolpropionic acid (trade name DMPA® from Mallinckrodt) are added and the mixture is stirred at unchanged temperature for a further 2.5 h until the calculated NCO content is reached (theoretical: 4.71% by weight, NCO/OH=2.00). The course of the reaction is monitored by acidimetry.

After cooling to 70° C., the prepolymer is then dispersed with vigorous stirring in 139.27 g of water to which, beforehand, 13.42 g (60 equivalent % neutralization, based on DMPA) of aqueous sodium hydroxide solution (4% by weight) have been added, and this mixture is subsequently stirred for approximately 15 minutes. Thereafter, to construct the polyurethane dispersion, chain extension takes place with 7.15 g (70 equivalent %) of a 50% by weight solution of ethylenediamine in water.

This gives a stable polyurethane dispersion having the following characteristics:

| | |
|---|---|
| Appearance | milky white |
| Solids content | 50.0% by weight |
| Charge density | 18.4 meq · (100 g)$^{-1}$ |
| EO content of prepolymer | 4.1% by weight |
| pH | 6.9 |

-continued

| Viscosity - Brookfield | 190 mPa · s (20° C.) |
| Average particle diameter | 140-180 nm |

Solvent-free electrosterically stabilized polyurethane dispersion from examples B.1 to B.4 using building blocks A.1 and A.2 (overview)

Preparation took place in the same way as in examples B.1 and B.3, but using:

|  | Example | | | |
|---|---|---|---|---|
|  | B.1 | B.2 | B.3 | B.4 |
| Building block ("dispersing diol") | 9.02 g A.1 | 8.95 g A.1 | 10.18 g A.2 | 8.67 g A.1 |
| Polymeric diol (100 g in each case) | PPG 2000 | Poly(propylene oxide)-block-poly(butylene oxide)-block-poly(propylene oxide) | PPG 2000 | PTHF 2000 |
| 1,4-Butanediol | 0.58 g | 0.58 g | 0.58 g | — |
| DMPA ® | 4.11 g | 4.11 g | 2.98 g | 3.63 g |
| IPDI | 41.52 g | 40.31 g | 37.77 g | 36.96 g |
| NaOH (4% by weight) | 21.45 g (70% neutr.) | 21.45 g (70% neutr.) | 13.42 g (60% neutr.) | 16.24 g (60% neutr.) |
| EDA (50% by weight) | — | — | 7.15 g | 7.00 g |
| Jeffamine D-230 (80% by weight) | 18.83 g | 18.26 g | — | — |
| H$_2$O | 130.59 g | 129.13 g | 139.27 g | 134.42 |
| NCO (theoretical) | 5.06% by weight | 4.95% by weight | 4.71% by weight | 4.68% by weight |
| Characteristics | | milky white liquid | | |
| Solids content [% by weight] | 52.5 | 52.5 | 50.0 | 50.0 |
| EO content of PP [% by weight] | 3.5 | 3.5 | 4.1 | 3.5 |
| Charge density [meq · (100 g)$^{-1}$] | 18.0 | 18.2 | Total 18.4 | 17.7 |

Example B.4

Solvent-free Electrosterically Stabilized Polyurethane Dispersion Based on Polytetrahydrofuran (PTHF) and Building Block ("dispersing diol") from Example A.1

Preparation took place in the same way as in examples B.1 and B.2 but replacing the polypropylene glycol by a polytetrahydrofuran diol (PTHF) having a hydroxyl number of 56.1 mg KOH·g$^{-1}$ (BASF AG).

| Appearance | milky white |
| Solids content | 50.0% by weight |
| Charge density | 17.7 meq · (100 g)$^{-1}$ |
| EO content of prepolymer | 3.5% by weight |
| pH | 6.8 |
| Viscosity - Brookfield | 195 mPa · s (20° C.) |
| Average particle diameter | 140-180 nm |

Solvent-free electrosterically stabilized polyurethane dispersion from examples B.1 to B.4 using building blocks A.1 and A.2 (overview)

Preparation took place in the same way as in examples B.1 and B.3, but using:

Profile of Properties of the Solvent-free Electrosterically Stabilized Polyurethane Dispersions from Examples B.1 to B.4

|  | Example | | | |
|---|---|---|---|---|
|  | B.1 | B.2 | B.3 | B.4 |
| Tensile strength σ$_M$ | 25.1 MPa | 25.8 MPa | 24.6 MPa | 23.0 MPa |
| Elongation at tensile strength ε$_M$ | 786% | 710% | 698% | 701% |

Material properties according to EN ISO 527

The invention claimed is:

1. A process for preparing an electrosterically stabilized polyurethane dispersion comprising
 a) preparing a hydrophilic and solvent-free macromonomer (A)(ii) with monomodal molecular mass distribution by
  a$_1$) reacting 50 to 100 parts by weight of a hydrophilic alkyl- or arylpolyalkylene glycol (A)(i) with 1 to 100 parts by weight of a polyisocyanate component (B)(i), optionally in the presence of a catalyst, in the absence of solvents, the reaction conditions and the selectivities of components (A)(i) and (B)(i) being chosen such that only one isocyanate group of component (B)(i) reacts with component (A)(i), and subsequently
  a$_2$) reacting the uniform preadduct from stage a$_1$) completely with 0.5 to 200 parts by weight of a compound (C) having two or more primary amino groups, secondary amino groups or hydroxyl groups which are reactive toward isocyanate groups and having a molecular mass of 50 to 500 daltons, in the absence of solvents, the reaction conditions and the selectivity of component (C) being chosen such that only one reactive group of component (C) reacts with the free isocyanate group(s) of the preadduct, and b) preparing the polyurethane dispersion by $b_1$) reacting 2 to 50 parts by weight of the hydrophilic and solvent-free macromonomer (A)(ii) with 25 to 250 parts by weight of the polyisocyanate component (B)(i), optionally in the presence of 0 to 50 parts by weight of a solvent component (D) and also of a catalyst, $b_2$) reacting the polyurethane preadduct from stage $b_1$) with 50 to 100 parts by weight of a polymeric polyol (A)(iii) and optionally with 0.5 to 10 parts by weight of a low molecular mass polyol component (A)(iv), optionally in the presence of a catalyst, $b_3$) reacting the homogeneous polyurethane preadduct from stage $b_2$) with 2 to 20 parts by weight of a polyol component (A)(v), optionally in the presence of a catalyst, $b_4$) admixing the homogeneous polyurethane prepolymer from stage $b_3$), before or during dispersion in 50 to 1500 parts by weight of water, with 2 to 20 parts by weight of a neutralizing component (E), $b_5$) dispersing the optionally (partially) neutralized polyurethane prepolymer from stage $b_4$) in 50 to 1500 parts by weight of water, which optionally further contains 0 to 100 parts by weight of a formulating component (F), and finally $b_6$) reacting the (partially) neutralized polyurethane prepolymer dispersion from stage $b_5$) with 3 to 60 parts by weight of a chain extender component (G) and also, subsequently or simultaneously, with 0 to 30 parts by weight of a chain stopper component (H).

2. The process of claim 1, wherein in reaction stage $a_1$) component (B)(i) is metered into component (A)(i), or component (A)(i) is metered into component (B)(i).

3. The process of claim 1, wherein reaction stages $a_1$) and $a_2$) are carried out at a temperature of 10 to 30° C.

4. The process of claim 1, wherein reaction stages $b_1$), $b_2$) and $b_3$) are carried out at a temperature 60 to 120° C.

5. The process of claim 1, wherein reaction stages $b_4$) and $b_5$) are carried out at a temperature of 40 to 60° C.

6. The process of claim 1, wherein reaction stage $b_6$) is carried out at 30 to 50° C.

7. The process of claim 1, wherein following reaction stage $b_6$) any free NCO groups still present are completely chain-extended with water.

* * * * *